(12) United States Patent
MacLeod et al.

(10) Patent No.: US 6,424,525 B1
(45) Date of Patent: Jul. 23, 2002

(54) EXTERNAL PERIPHERAL ATTACHMENT DEVICE FOR USE AS A HUB OR COMPUTER

(75) Inventors: Sean M. MacLeod; Jerry M. Yamamoto, both of Seattle; Mark Tempel, Issaquah, all of WA (US)

(73) Assignee: Stratos Product Development LLC, Seattle, WA (US)

( * ) Notice: Subject to any disclaimer, the term of this patent is extended or adjusted under 35 U.S.C. 154(b) by 0 days.

(21) Appl. No.: 09/648,670

(22) Filed: Aug. 25, 2000

Related U.S. Application Data
(60) Provisional application No. 60/151,036, filed on Aug. 27, 1999.

(51) Int. Cl.$^7$ .................................................. G06F 1/16
(52) U.S. Cl. ..................... 361/686; 361/756; 361/802; 312/223.1
(58) Field of Search ................................ 361/680–683, 361/686, 725–727, 741, 754, 756, 802, 600, 679; D6/396, 397; D14/100, 114; 312/223.1, 223.2

(56) References Cited

U.S. PATENT DOCUMENTS

| | | | | |
|---|---|---|---|---|
| 6,072,695 A | * | 6/2000 | Steiger et al. | 361/686 |
| 6,221,012 B1 | * | 4/2001 | Maschke et al. | 600/301 |
| 6,238,344 B1 | * | 5/2001 | Gamelsky et al. | 600/437 |
| 6,297,953 B1 | * | 10/2001 | Helot | 361/686 |

* cited by examiner

Primary Examiner—Darren Schuberg
Assistant Examiner—Hung Van Duong
(74) Attorney, Agent, or Firm—Ronald M. Anderson

(57) ABSTRACT

The present invention is a system that enables a plurality of external peripheral devices to be easily connected to a conventional personal computer, or other computing device. The system can include the computer, or can alternatively be configured as a hub. In either configuration, the system includes an arcuate-shaped interface surface, on a base. One end of the interface surface includes an upright chassis, which includes a plurality of bays. Rails extend longitudinally along the interface surface, toward each bay. An external peripheral device is slid over a rail, which provides attachment and stability to the device and aligns it with the bay. Each bay includes an alignment pin, a power connection, and a data connection. Adjacent to each rail is a latch for securing an external peripheral device in a bay. The top of the chassis includes a marking to provide a visual reference that aids in attaching an external peripheral device to a bay. The rails can provide an electrical ground and/or include an element that provides electro-static discharge protection. In one embodiment, the rails are configured to provide electrical contact for coupling power into a peripheral device, and/or coupling to a data port on an external peripheral device.

40 Claims, 6 Drawing Sheets

EXTERNAL PERIPHERAL ATTACHMENT DEVICE FOR USE AS A HUB OR COMPUTER

RELATED APPLICATIONS

This application is based on prior U.S. provisional patent application Ser. No. 60/151,036 filed Aug. 27, 1999 now abandoned, the benefit of the filing date of which is hereby claimed under 35 U.S.C. §119(e).

FIELD OF THE INVENTION

This invention generally relates to apparatus and a method for coupling devices to a computer, and more specifically, to attaching external devices to a computer at a plurality of bays that provide data and power connection terminals.

BACKGROUND OF THE INVENTION

The computer industry is currently miniaturizing the form factor of computer system circuit boards and the housings used for personal computers to minimize the space required for these devices. In doing so, the industry has eliminated or minimized the availability of expansion capabilities for computer systems. Other methods for expanding a computer to add increased functionality using external peripherals are often extremely hard to use and configure, require independent expensive data cables and power supply connectors, have non-standard interfaces with non-standard form factors, and do not address the need for casual inter-system exchangeability.

For example, in the past, if a user wished to connect a scanner to a personal computer, it has generally been necessary to first install a small computer system interface (SCSI) card in an available slot on the data bus provided inside the personal computer, so that the scanner can be coupled to the computer through an external SCSI data connection. The SCSI interface card will likely require an interrupt (IRQ) and memory assignment for use by the operating system of the computer. Even with the capability to install such devices using "plug and play" functionality provided in modern graphical user interface operating systems, it may be difficult to achieve a functional installation of the SCSI interface card if there is no available IRQ, or worse, if there is no available slot on the data bus in which to install the card. Each additional device that is added to the computer system exacerbates this problem.

One solution that has been developed and is being provided on currently available personal computers makes use of the expansion capabilities of the universal serial bus (USB) port. Computers currently being sold often include two USB ports that enable the user to more conveniently connect external peripheral devices such as scanners, pointing devices, digital speakers, modems, and other such devices that have been designed to connect to a USB port. While the provision of USB ports on personal computers greatly simplifies the connection of USB-enabled external peripheral devices, there are certain limitations to this solution. Specifically, the USB ports typically provided on personal computers are unable to provide more than a minimal amount of power to energize external peripheral devices. Further, there is a limit to the number of such devices that can be daisy-chained together, which is typically less than that nominally possible under the USB specification.

To address this problem, a user can purchase a USB hub that includes a power supply and provides additional USB ports through which peripheral devices having a USB connector can be interfaced with the personal computer. These hubs connect to the personal computer through one of the two USB ports and may include a power supply to increase the amount of power that can be supplied to energize external peripheral devices that are connected to the hub via the USB ports. However, each external peripheral device is connected to the hub through an appropriate USB connector cable. In addition, some external peripheral devices that communicate with a computer through the USB port may still connect to a transformer or power supply "brick" that is plugged into an alternating current (AC) line plug to be supplied with the required electrical power. When several such external peripheral devices are added to a personal computer or hub, the resulting tangle of USB cables and power leads can be unsightly and is clearly undesirable. Also, moving the personal computer or hub requires moving the cables and the power supply, as well.

It would thus be desirable to provide a hub for USB expansion (or for expansion that involves adding devices communicating using an alternative data format) that can provide power for energizing external peripheral devices connected thereto and eliminate data and power cables for each connected external peripheral device. Such a hub should have bays for directly coupling to the external peripheral devices and should ensure that these devices are correctly mated with the hub.

The computer industry has long sought the use of modular, interchangeable components internal to the system chassis. However, modular components that plug into a data bus socket are clearly limited in form factor, particularly as the size of the motherboard and chassis continues to be reduced in computers currently being marketed. The time is thus ripe for an entirely new concept in computer design in which the form of modular components is not limited by the extent or size of an internal chassis and the fit of components on a motherboard. Instead, it would be preferable to provide a compact computer in which external modular peripheral components can be selectively added without significant limitations to the form factor of the modules. The computer should readily couple to the external peripheral modular components, substantially eliminating independent external cable connections, and should permit attachment of the modules, with the computer disposed in any orientation. The same features would also be desirable in a hub, as discussed above.

SUMMARY OF THE INVENTION

In accord with the present invention, apparatus is defined for supporting a plurality of external peripheral devices and coupling the plurality of external peripheral devices to a computing device. The apparatus includes a base and a plurality of bays defined on the base. Each bay interfaces with an external peripheral device and includes a data connection for directly coupling to a data port on an external peripheral device. In addition, each bay has a power connection for supplying electrical power directly to a power port on an external peripheral device. A rail provides for alignment of an external peripheral device in the bay, and is adapted to mechanically attach an external peripheral device to the base.

Each rail preferably has a cross-sectional configuration that is generally either a C-shape or a T-shape. Also, in one alternative configuration, each rail comprises a plurality of non-contiguous sections.

A visual alignment element is included in each bay to aid in properly positioning an external peripheral device with respect to the bay. In addition, in one embodiment, each bay further includes an alignment pin that guides an external peripheral device, thereby ensuring that the data connection and the power connection of the bay properly couple to a data port and a power port, respectively, on an external peripheral device. Although the type of data connection generally depends upon the type of external peripheral device, it is expected that the data connection can include a USB 1.X interface, a USB 2.X interface, an IEEE 1394 interface, a SCSI interface, a peripheral component interconnect (PCI) interface, a personal computer memory card international association (PCMCIA) interface, or an infrared data association (IRDA) interface.

Another feature that may be provided in the power connection is a component that senses the power requirements of any external peripheral device coupled thereto, and automatically provides a required voltage and a required current thereto.

Preferably, in one form of the invention, a computing device is coupled to each data connection. Consequently, any external peripheral device coupled to the data connection is thereby coupled to the computing device. Alternatively, each data connection is adapted to couple to an external computing device. In this case, when the data connection is coupled to the external computing device, an external peripheral device coupled to the data connection is thereby coupled to the external computing device.

The base further includes a latching mechanism for each bay, to secure an external peripheral device within the bay. Furthermore, the latching mechanism for each bay includes a release, enabling an external peripheral device secured within the bay to be selectively released.

The rails in adjacent bays are generally parallel to each other. Further, the rails extend over a surface that is arcuate in shape.

Another aspect of the present invention is directed to a method for coupling a plurality of external peripheral devices to a computing device. This method includes steps that generally correspond to the functions performed by the elements of the apparatus described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention can be alternatively configured as: (a) a computer, or (b) as a hub. The hub is adapted to connect with a conventional personal computer or other computing device such as a laptop, hand-held computer, workstation, etc. In one preferred embodiment that is disclosed below, both the computer and the hub form of the present invention have generally the same appearance, and are characterized by providing means enabling one or more external peripheral devices to be coupled to the computer or hub.

Figure 1:
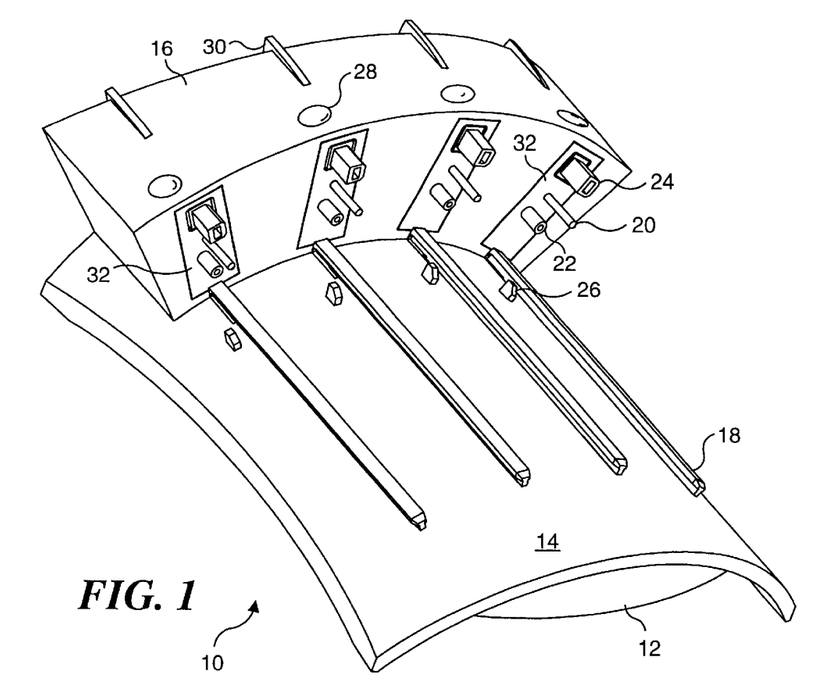
FIG. 1 is an isometric view of a hub (or computer) in accord with the present invention, which is adapted to connect with a plurality of external peripheral devices.
Figure 2:
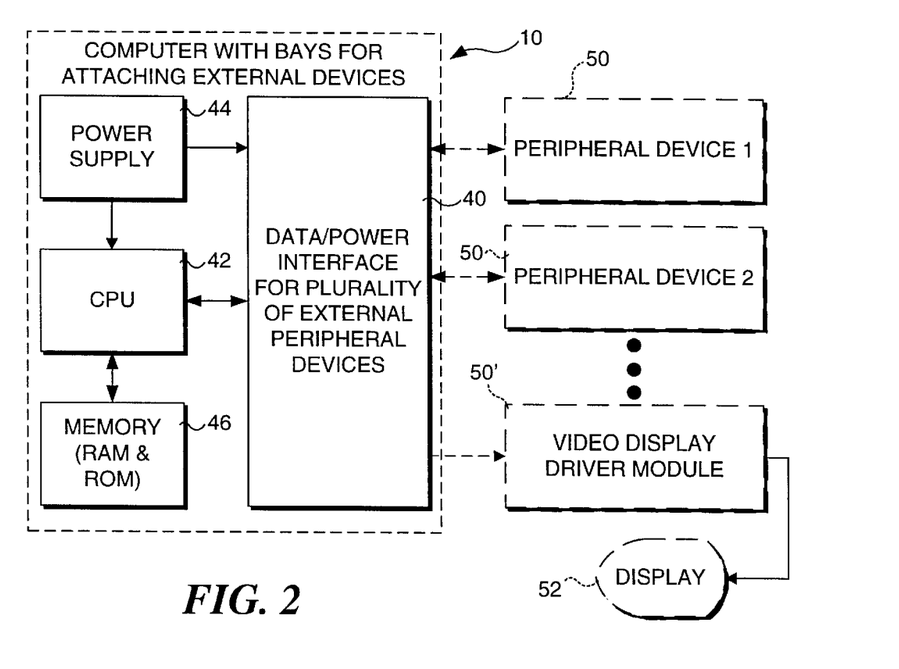
FIG. 2 is a schematic block diagram illustrating components of a computer in accord with the present invention.

To simplify the following explanation, unless inappropriate in the context of the discussion, both the computer form and the hub form of the present invention will be referred to as a "system." Thus, in FIGS. 1 and 4–7, a preferred embodiment of a system 10 is shown in accord with the present invention, and it will be understood that system 10 may comprise either the hub or the computer form of the invention. In FIG. 2, a block diagram of the computer form of the invention is illustrated, while in FIG. 3, a block diagram includes the hub form of the present invention.

System 10 includes a base 12, over which an interface area 14 extends in a curve having an upper convex surface from side to side. Extending longitudinally along interface area 14 are a plurality of spaced-apart rails 18 that are generally T-shaped in cross section. However, it is contemplated that rails 18 may instead have other cross-sectional shapes, including a C-shape.

At one end of interface area 14 is an upright chassis 16 in which are disposed at least one bay 32. The illustrated embodiment includes four bays 32, but either fewer or more bays may be provided. Each bay 32 includes an alignment pin 20, a power connection 22, and a data connection 24. Adjacent to each rail 18 is disposed a latch 26, which is beveled at a rearward-facing corner of its top surface to facilitate engagement with one of the external peripheral devices that will be attached to system 10. By latching each peripheral device in its proper position on the rail, it is possible to orient the system in virtually any desired orientation without concern that the peripheral device will become unseated from the rail (e.g., due to gravity or jostling).

Figure 8:
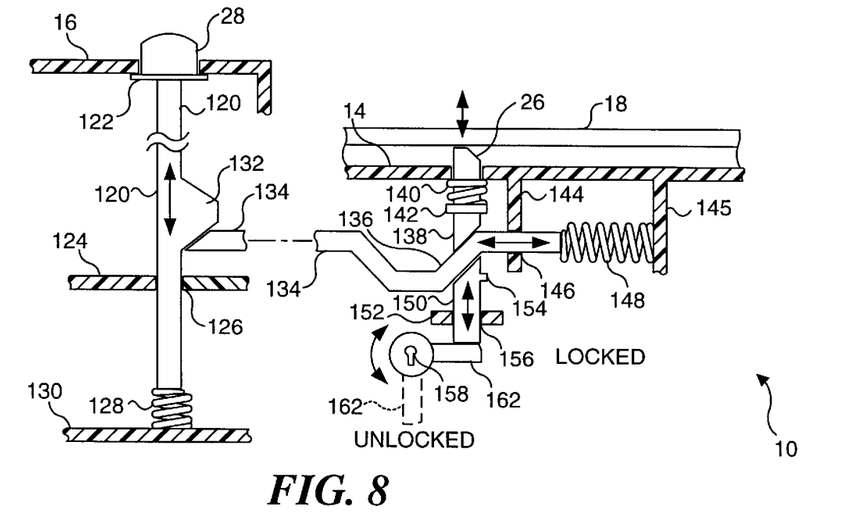
FIG. 8 is an elevational side view of an internal latch/release mechanism used for selectively releasing a peripheral device from the hub (or computer)

FIG. 8 illustrates details of the latching mechanism, showing how depressing a release button 28 enables a peripheral device to be unlatched for removal. Release button 28 is disposed at one end of an actuator shaft 120, which is slidably mounted within system 10. The outward travel of release button 28 is limited by a lip 122 that extends around it inner periphery, contacting the inner surface of chassis 16. Actuator shaft 120 extends through an orifice 126 formed in a support 124 and its lower end (as illustrated) rests on a helical spring 128, which applies an upwardly directed biasing force that resists the depression of release button 28. Helical spring 128 rests on an internal surface 130 of chassis 16.

When release button 28 is depressed, it moves a ramped portion 132 of actuator shaft 120 downwardly, so that ramped portion 132 interacts with a sloping end of a release rod 134, forcing the release rod to the right (as illustrated in FIG. 8). Release rod 134 includes a generally "V-shaped" section 136 disposed adjacent to an inner end of a latch bar 138. Latch 26 comprises an outwardly extending end of latch bar 138. A helical spring 140 is disposed between a collar 142 formed on latch bar 138 and an inner surface of interface area 14, providing a biasing force directed against collar 142 that tends to release the latch. However, latch bar 138 normally is prevented from moving downwardly to its released position due the interference provided by V-shaped section 136. It is only when the V-shaped section is force to the right as a result of a user depressing release button 28 that latch bar 138 can move downwardly sufficiently into the V-shaped section to release a peripheral device. A helical spring 148 is disposed between one end of release rod 134 and an internal supporting wall 145. Helical spring 148 applies a biasing force that tends to keep release rod disposed to prevent the latch from releasing until the force exerted by ramp section 132 on the other end of the release rod moves the release rod to compress helical spring 148 and shift V-shaped section 136 so that latch bar 138 moves downwardly. The end of release rod 134 is slidably supported by an internal wall support 144 in which is formed an orifice 146 through which the release rod extends.

Also optionally included is a locking bar 150, which is slidably mounted in a support 152. The locking bar extends downwardly through an orifice 156 that is formed in support 152. A tab 154 disposed on one side of the locking bar 150 prevents the locking bar from sliding completely through orifice 156, while enabling the locking bar to be moved within the orifice between a locked position (in which it is shown) and an unlocked position, in which the locking bar is allowed to drop down within orifice 156 until tab 154 contacts support 152. A keyed cylinder lock 158 is optionally included on one side of system 10 and actuates a restraint arm 162, when the keyed cylinder lock is rotated with an appropriate key between the locked position in which restraint arm 162 is shown in the Figure, and an unlocked position (indicated by the phantom view). A similar restraint arm is provided for each of the rails on system 10, all of the restraint arms being rotated by the user rotating keyed cylinder lock 158.

On the upper surface of chassis 16 is disposed a visual alignment feature 30 for each bay 32. The visual alignment feature provides a visual reference when attaching the external peripheral device to the rail associated with that bay. Also disposed on the upper surface of chassis 16, adjacent to corresponding visual alignment features, are release buttons 28. A separate release button 28 is provided for each of the external peripheral devices or bays 32, and when depressed, causes latch 26 for that bay to disengage from the external peripheral device so that the device can be removed from the bay. The latching and release mechanism described above is provided for each bay 32.

The spacing between bays 32 and rails 18 is chosen such that any reasonably sized external peripheral device can be attached to one of the bays on system 10 without interfering with another external peripheral device. Each external peripheral device is configured as a module with elements that match corresponding element in each bay 32 and the module includes a slot 108 (shown in FIG. 7) that slides freely over rail 18. Not shown are an alignment pin sleeve, a data connection receptacle, a power connection receptacle, and a latch relief.

The method for attaching an external peripheral device 50 (shown in FIGS. 2 and 3) to system 10 is to slide the external peripheral device along rail 18, after inserting the rail into slot 108 on the device. The rail provides attachment and stability in regard to two orthogonal axes and three axes of rotation, as well as ensuring alignment of the power and data connections in the associated bay. The external peripheral device is slid along the rail, with alignment pin 20 and the alignment sleeve on the device mating to provide fine alignment of the data and power connections. As the external peripheral device is slid along the rail to its final position, data connection 24 and power connection 22 mate with the corresponding data connection receptacle and power connection receptacle on the device, and the latch relief engages latch 26 to lock the device in place. The latch maintains the data and power connections to the device, even if system 10 is subject to movement or vibration, and secures the device to interface area 14 such that the system and attached external peripheral devices can be placed in any orientation. To remove an external peripheral device 50, the user presses release button 28 and removes the device by sliding it off rail 18.

In the preferred embodiment, each rail 18 is continuous over its full length. It is also contemplated that non-contiguous, multiple lengths or sections of rail might be used, so that different portions of slot 108 (or different slots) in the external peripheral device would engage different sections of the rail. In the illustrated preferred embodiment, the connection between rail 18 on interface area 14 and slot 108 on the peripheral module is centered across the width of the device. It is also contemplated that an external peripheral device can engage a rail at a location that is disposed off center, along one edge, or along both edges of the device.

As described above, rail 18 is primarily used for alignment of the external peripheral device when the device is attached to the interface area 14; however, in other contemplated embodiments, the rail can provide an electrical ground and/or comprise an element employed for electrostatic discharge (ESD) protection. It is also clear that the rail can be provided with electrical contacts for coupling power into an external peripheral device and/or for a data connection with the device. In the event that both power and data connections are provided on the rail, it will be apparent that either safety features or keying features should be provided to ensure that power and data signals are not shorted or cross-connected, which might damage the device or the system, or cause other problems. If the power and/or data connections are integrated into the rail, separate power connections 22 and data connections 24 will not be required on chassis 16.

Figure 9:
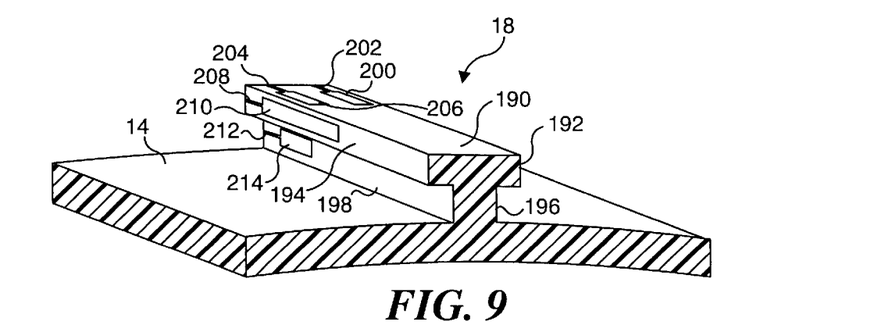
FIG. 9 is an isometric sectional view of a portion of one of the rails, showing the data and power pads.
Figure 10:
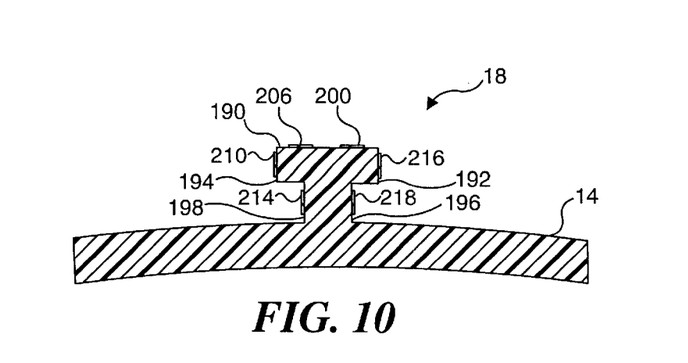
FIG. 10 is a cross-sectional elevational view of one of the rails, showing the pads used for convey data and power.

FIGS. 9 and 10 illustrate details for one preferred embodiment in which power and data connections are integrated into rail 18. As noted above, each rail 18 is generally T-shaped, having a top 190, outer sides 192 and 194, and inner sides 196 and 198. On top 190 of each rail 18 are disposed a data⁻ pad 200 and a data⁺ pad 206, which are respectively coupled to circuitry in chassis 16 by conductive traces 202 and 204. Bi-directional USB data communication is thus provided for any peripheral device that is seated on rail 18 through the two data pads via corresponding wipers that are provided in the peripheral device that electrical contact data⁻ pad 200 and data⁺ pad 206. On outer sides 192 and 194 are respectively included a power pad 216 and a ground pad 210, which are in turn respectively connected to power supply 44 (see FIG. 2) within chassis 16 via conductive traces (only a conductive trace 208 for ground pad 210 is shown). Power pad 216 will likely supply a +5 VDC level to a peripheral device that is latched on rail 18 through corresponding conductive wipers in the peripheral device (not shown). In addition, the inner sides of rail 18 include a power pad 214 and a power$^+$ pad 218 that are coupled to power supply 44 within chassis 16 via conductive traces (only a conductive trace 212 for power is shown). Depending upon the peripheral device, the voltage levels supplied by these latter two conductive pads to corresponding wipers within the peripheral device (not shown) might be −12 VDC, +12 VDC; or −15 VDC, +15 VDC; or −24 VDC, +24 VDC; etc. It will be noted that ground pad 210 is substantially longer than all of the other pads illustrated. By making ground pad 210 longer, the ESD protection discussed above is provided for rail 18, since any static discharge from a peripheral device will be conducted to ground via the ground pad before any other pad on the rail comes into contact with the corresponding electrical wiper provided in the peripheral device. Alternatively, instead of making ground pad 210 longer than the other pads, the disposition of the corresponding wiper within the peripheral device could be selected so that the wiper first contacts the ground pad before any other wipers contact the other pads. By discharging static voltage that may be built up on the peripheral device through the ground pad, it is prevented from damaging circuitry within system 10.

Other types of data can be provided via pads on the rails, in addition to, or instead of the USB data$^+$ and data$^{31}$ pads noted above. It is also contemplated, that either the power or the data will not be provided on the rail, but instead through the connections provided on the chassis. For example, if the peripheral device that is being used on a rail does not communicate via USB, it would not include the wipers to contact the USB data pads provided on the rails. Similarly, wipers to connect with the pads that provided any of the voltage levels on the rail can be omitted in the peripheral device and the appropriate power provided from the power supply through a power connector in the bays on chassis 16.

As shown, data connection 24 comprises a standard USB 1.X connector. In other embodiments, the data connection can be configured for USB 2.X+, IEEE 1394 (Firewire), SCSI (i.e., any SCSI derivative), PCI, PCMCIA, and IRDA interfaces, or other proprietary connection forms and formats. The data connection for these alternative interfaces may also be achieved through the integration of data contacts into the rail, as noted above.

In FIG. 2, system 10 includes components so that it functions as a computer. Specifically, in this form of the invention, data/power interface 40 is provided to convey the data and power to external peripheral devices 50. A central processing unit (CPU) 42 in this form of the invention is coupled to a power supply 44 and to a memory 46. Power supply 44 includes the auto sensing circuitry discussed above and is connected to the data/power interface. Memory 46 includes both random access memory (RAM) and read only memory (ROM). The function of the memory is generally similar to that in a conventional personal computer. It is contemplated that a video display driver 50' might be included as one of the external peripheral devices, to drive a display 52.

Figure 3:
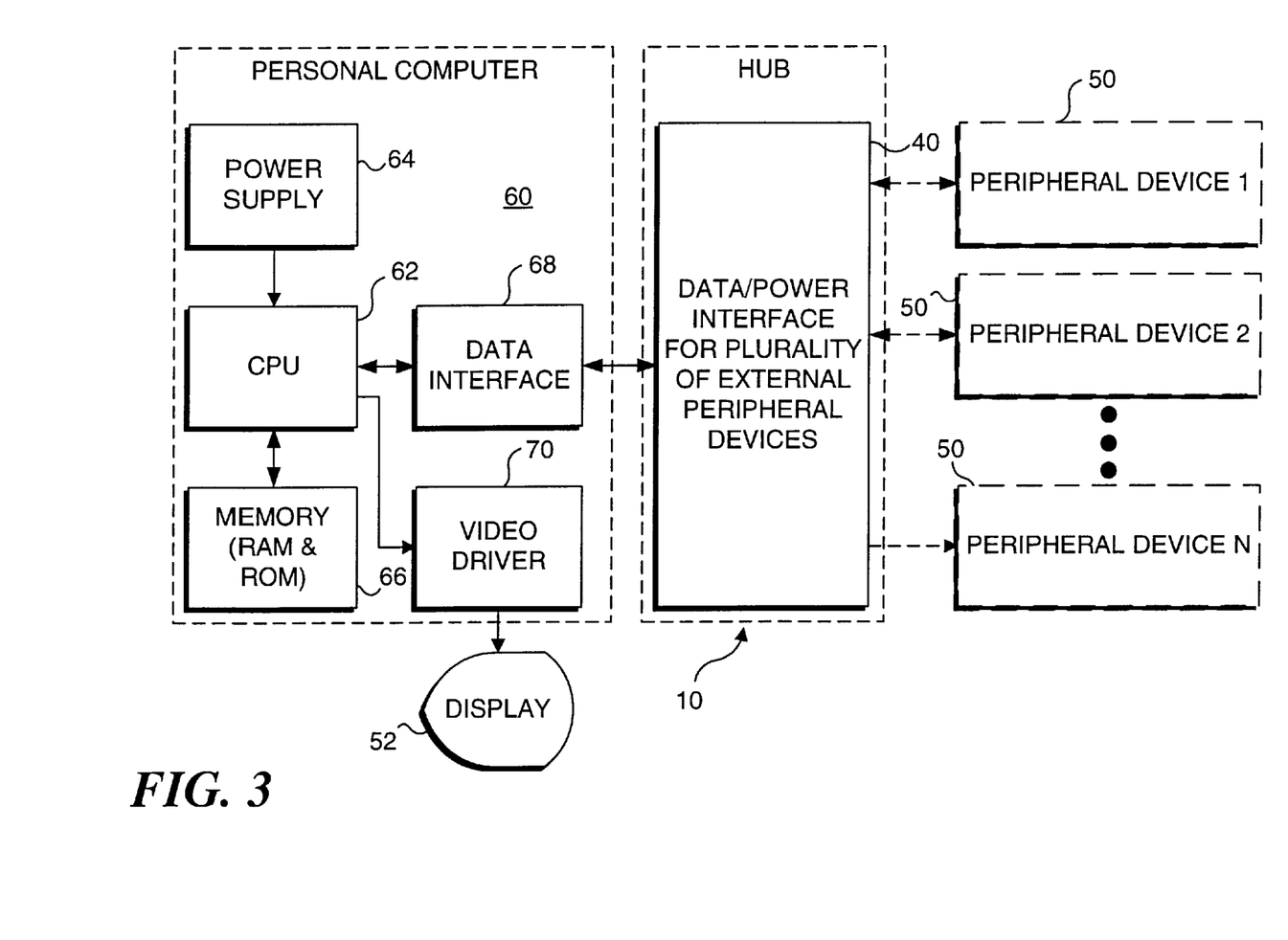
FIG. 3 is a schematic block diagram illustrating components of a conventional personal computer, which is connected to a hub in accord with the resent invention.
Figure 4:
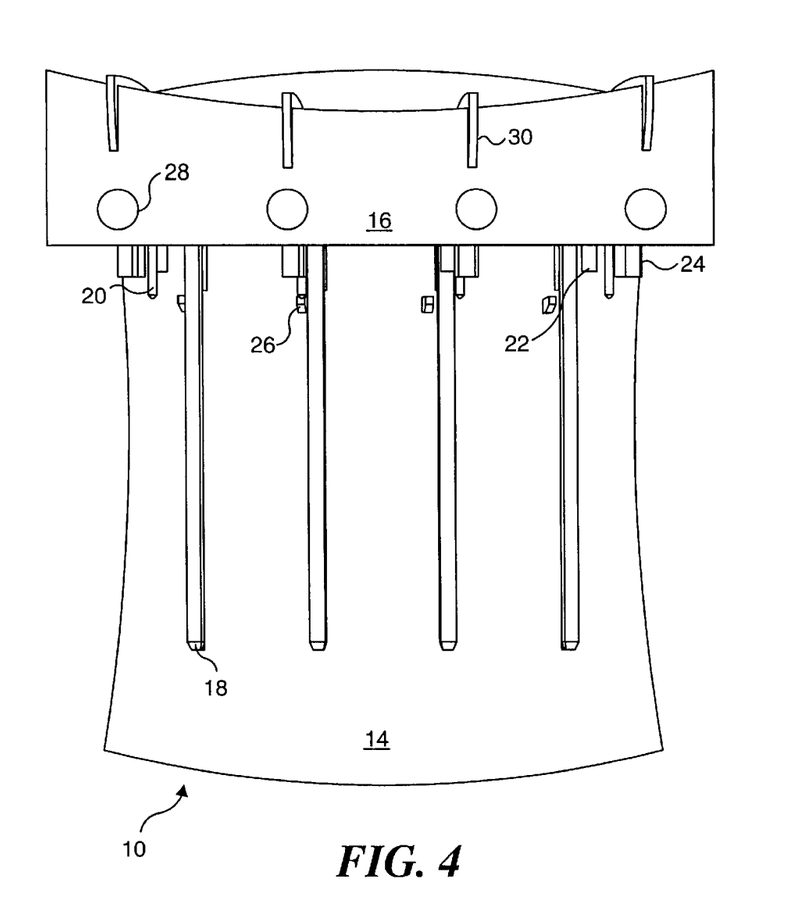
FIG. 4 is a plan view of the hub (or computer) of FIGS. 1–3.
Figure 5:
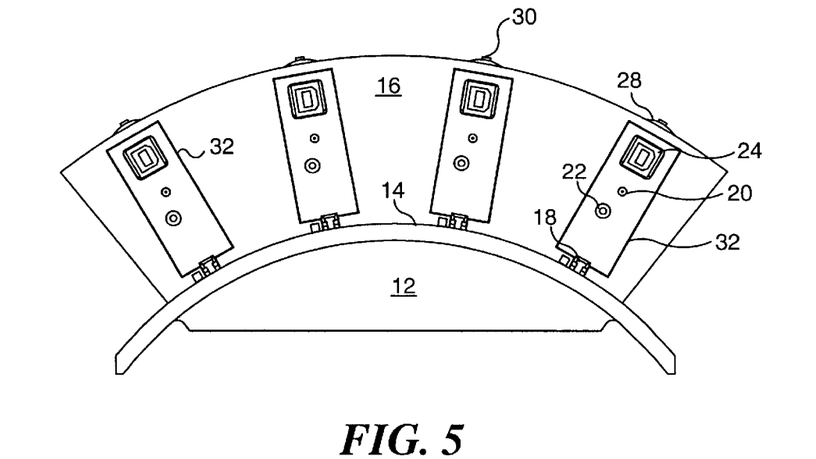
FIG. 5 is a rear elevational view of the hub (or computer) of FIGS. 1 and 2.

In FIG. 3, system 10 is used as the hub for coupling external peripheral devices 50 to a conventional personal computer 60. The conventional personal computer again includes a CPU 62, a power supply 64, and a memory 66. It also includes an appropriate data interface 68 for coupling in data communication with the hub provided by system 10. A video driver 70 will likely be included in personal computer 60 for driving display 52. The hub of system 10 again includes data/power interface 40 that is adapted to couple to each of external peripheral devices 50, both supplying them power and serving as an interface with personal computer 60 for convey data therebetween.

Figure 11:
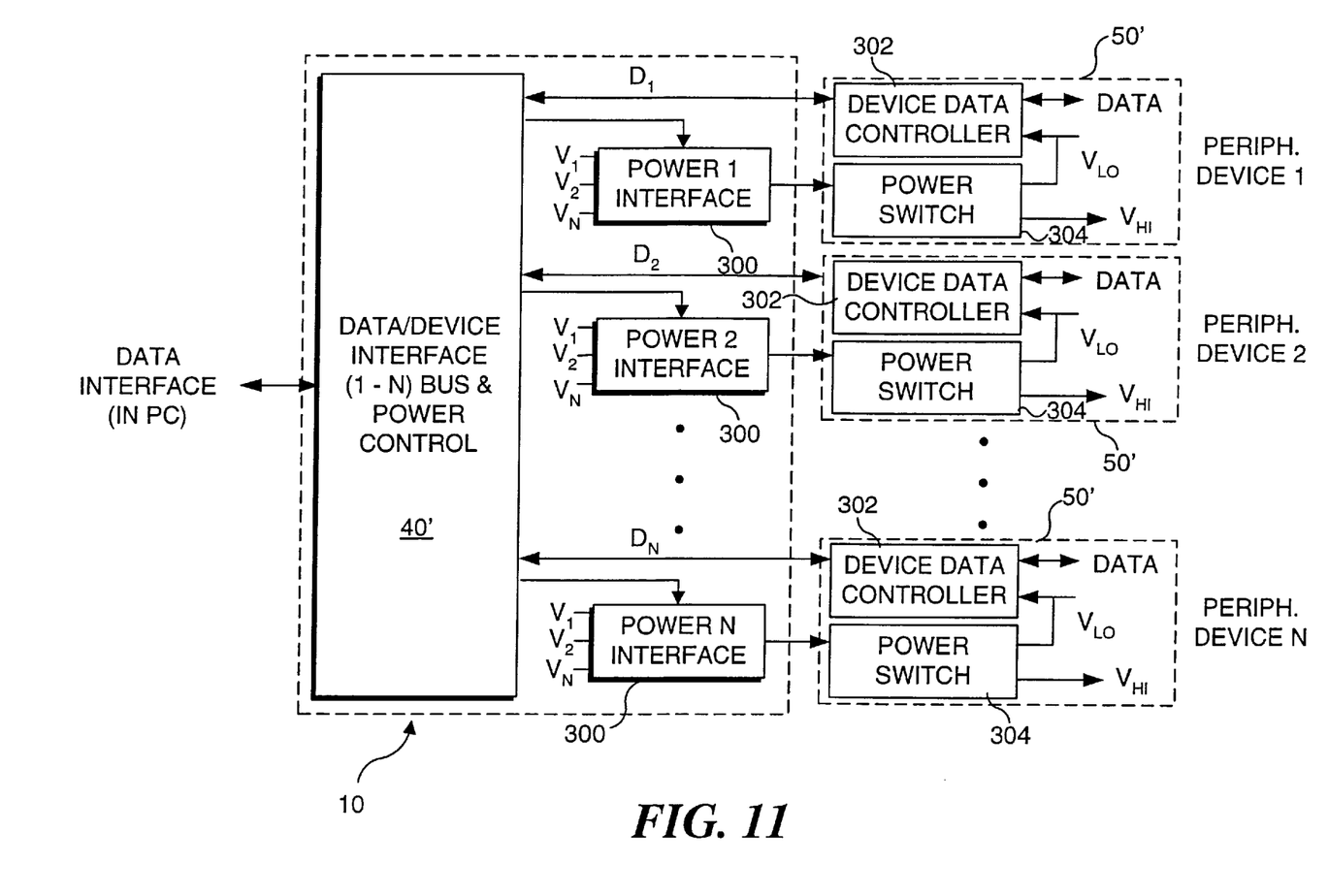
FIG. 11 is a schematic block diagram of the hub illustrating components used in providing an appropriate voltage and current to energize each of N peripheral devices.

It is further preferred that system 10 be able to sense or respond to data indicative of the voltage and current requirements of a external peripheral device, to automatically provide the required voltage and amperage for the external peripheral device coupled thereto. FIG. 11 illustrates a preferred embodiment in which this feature is implemented when system 10 is used as a hub, but it can also be implemented when system 10 is a stand-alone computer. For the hub application, system 10 is coupled to a data interface in a PC, just as in FIG. 3. A data/device interface bus for from 1 to N peripheral devices 40' is coupled to the data interface in the PC. In addition, a plurality of 1 to N power interfaces 300 are included in the hub for supplying the appropriate voltage and current to each peripheral device 50' that is mated with the hub. Power interfaces 300 are each a digital voltage regulator or a plurality of switched power supply. Included in each peripheral device is a device data controller 302, which typically conveys data bi-directionally between the hub and the peripheral device. Also included in peripheral device 50' is a power switch 304. Power switch 304 controls the application of voltage supplied by the hub to the peripheral device. When a peripheral device is initially mated with the hub, the peripheral device receives a default minimum voltage, $V_{LO}$, which will likely be 5 VDC at about 100 ma. The power switch is energized by this default voltage, as is device data controller. Device controller 302 enunciates the peripheral device on the hub and communicates its voltage and current requirements to power interface 300 over the appropriate data line, $D_1$–$D_N$. In response, the data/device interface bus and power control 40' causes power interface 300 to provided the requested voltage and current over the power input to the peripheral device, which is then output from power switch to the peripheral device circuitry, as voltage $V_{HI}$. In this manner, each different peripheral device is able to enunciate itself on the bus when supplied with $V_{LO}$ and request the voltage and current that it requires for normal operation, which the hub then supplies as $V_{HI}$. At no time is any portion of the peripheral device supplied with a voltage or current greater than its rated level.

Figure 6:
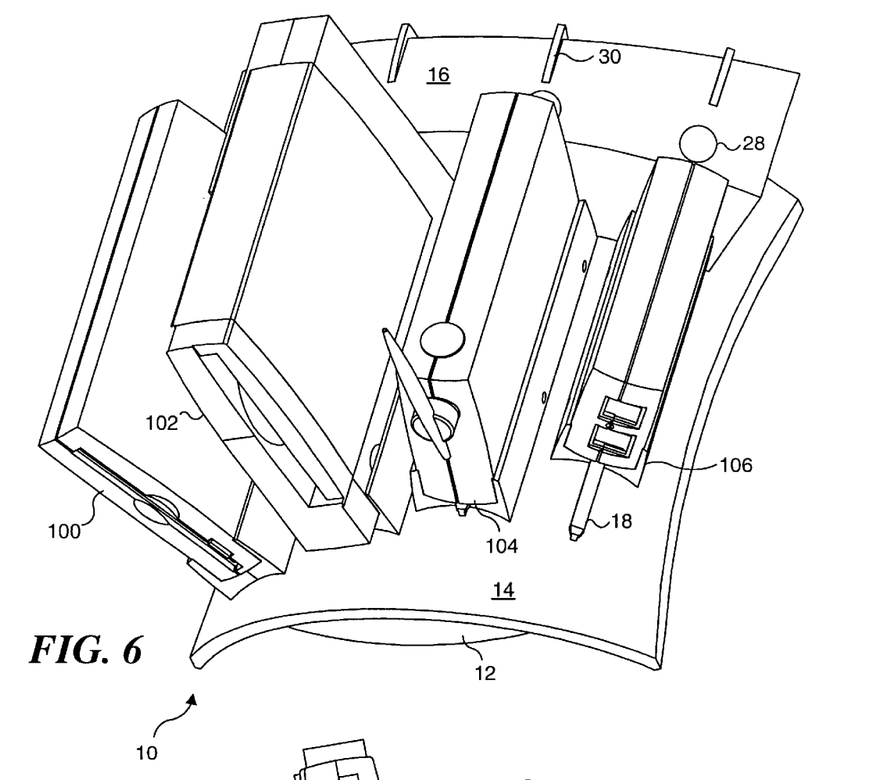
FIG. 6 is a view of the hub (or computer) of FIGS. 1–3, showing a plurality of external peripheral devices connected thereto.
Figure 7:
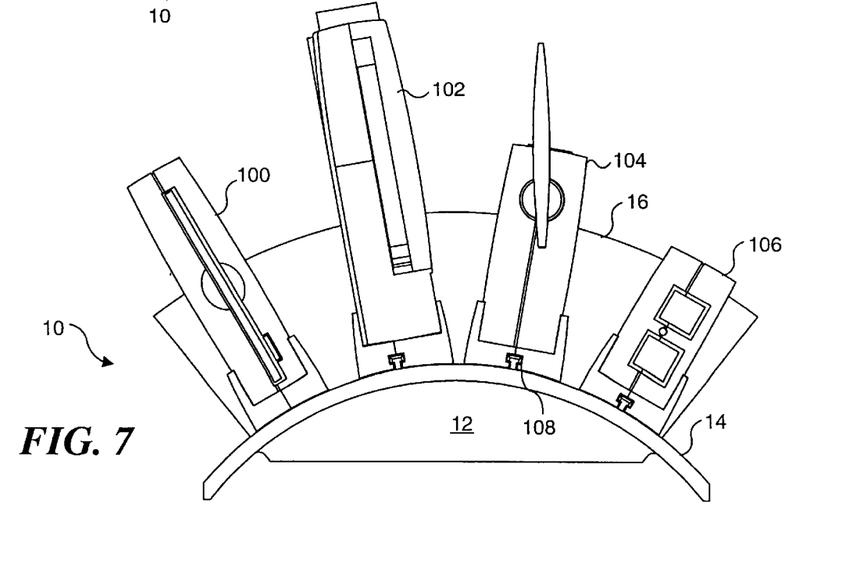
FIG. 7 is a rear elevational view of the plurality of peripheral devices connected to the hub (or computer)

While not intended to be in any way limiting in regard to the types of external peripheral devices that can be used with the present invention, FIGS. 6 and 7 illustrate several different external peripheral devices attached to system 10, including a floppy disk drive 100, an Iomega Corporation ZIP™ drive 102, a radio frequency network transceiver 104, and a voice recognition module 106. Other prospective external peripheral devices include modems of all types, other RF device transceivers, video links, audio links, hard drives, DVD drives, CD drives, scanners, MP3 players, smartcard readers, barcode readers, digital cameras, digital video recorders, speaker amplifiers, and other peripheral devices not even yet known.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. Apparatus adapted to support a plurality of external peripheral devices thereon and for connecting the plurality of external peripheral devices to a computing device, said apparatus comprising:
(a) a base; and
(b) a plurality of bays defined on the base, each bay interfacing with an external peripheral device and each bay including:
(i) a data connection for directly coupling to a data port on an external peripheral device;
(ii) a power connection for supplying electrical power directly to a power port on an external peripheral device; and
(iii) a rail providing alignment of an external peripheral device in the bay, said rail being adapted to mechanically engage an external peripheral device so as to attach an external peripheral device to the base.

2. The apparatus of claim 1, wherein each rail has a cross-sectional configuration that is generally one of a C-shape and a T-shape.

3. The apparatus of claim 1, wherein each rail comprises a plurality of non-contiguous sections.

4. The apparatus of claim 1, wherein each bay further includes a visual alignment element to aid in properly positioning an external peripheral device with respect to the bay.

5. The apparatus of claim 1, wherein each bay further includes an alignment pin that guides an external peripheral device to ensure that said data connection and said power connection of the bay properly couple to a data port and a power port, respectively, on an external peripheral device.

6. The apparatus of claim 1, wherein said data connection comprises at least one of a USB 1.X interface, a USB 2.X interface, an IEEE 1394 interface, an SCSI interface, a PCI interface, a PCMCIA interface, and an IRDA interface.

7. The apparatus of claim 1, wherein said power connection includes a component that senses the power requirements of any external peripheral device coupled thereto, and automatically provides a required voltage and a required current thereto.

8. The apparatus of claim 1, wherein a computing device is coupled to each data connection, such that an external peripheral device coupled to the data connection is thereby coupled to said computing device.

9. The apparatus of claim 1, wherein each data connection is adapted to couple to an external computing device, such that when said data connection is coupled to an external computing device, an external peripheral device coupled to the data connection is thereby coupled to an external computing device.

10. The apparatus of claim 1, wherein the base further includes a latching mechanism for each bay to secure an external peripheral device within the bay.

11. The apparatus of claim 1, wherein the rails in adjacent bays are generally parallel to each other.

12. The apparatus of claim 1, wherein said base has a surface that is arcuate in shape.

13. The apparatus of claim 10, wherein the latching mechanism for each bay includes a release, enabling an external peripheral device secured within the bay to be selectively released.

14. The apparatus of claim 10, wherein the latching mechanism includes a lock that can be set to prevent the external peripheral devices from being unlatched.

15. Apparatus for supporting a plurality of external peripheral devices so that they can be connected to a computing device, comprising:
(a) a base having a data connection adapted to couple directly to a data port on an external peripheral device, to convey data between an external peripheral device and a computing device without using any external cable extending between the external peripheral device and the computing device, said base comprising a rail having a size and shape generally corresponding to a receiver opening in a housing of an external peripheral device, said rail being thereby adapted to align an external peripheral device relative to the base and to mechanically attach an external peripheral device to the base; and
(b) a power connection for coupling directly to a power port on an external peripheral device.

16. The apparatus of claim 15, wherein a surface of said base is arcuate in shape.

17. The apparatus of claim 12, wherein said base further comprises an alignment pin, adapted to facilitate aligning a data port and a power port of an external peripheral device to said data connection and said power connection on the base.

18. The apparatus of claim 12, wherein said base further comprises a visual alignment marking, adapted to facilitate aligning an external peripheral device being coupled to said data connection and said power connection on said base.

19. The apparatus of claim 12, wherein said base further comprises a latch, adapted to secure an external peripheral device to said base.

20. The apparatus of claim 12, wherein said power connection senses power requirements of an external peripheral device coupled thereto, and automatically provides a required voltage and current to energize the external peripheral device.

21. The apparatus of claim 15, wherein said rail is adapted to align an external peripheral device relative to at least one of said data connection and said power connection.

22. The apparatus of claim 12, wherein at least one of said data connection and said power connection comprises a rail, said rail being adapted to align an external peripheral device relative to said base, and to attach an external peripheral device thereon.

23. The apparatus of claim 12, further comprising a computing device disposed within said base and internally coupled to said data connection.

24. The apparatus of claim 16, wherein the base includes an upright portion extending above said surface, at least one of said data connection and said power connection being disposed within the upright portion.

25. Apparatus for coupling a plurality of external peripheral devices to a computing device, comprising:
a base having an arcuate surface and an upright portion disposed adjacent one end of the arcuate surface, said base including a plurality of bays, each bay including a data connection adapted to couple directly to a data port on an external peripheral device and a power connection adapted to couple directly to a power port on an external peripheral device, each bay further including a rail disposed on the arcuate surface of the base, said rail serving to align an external peripheral device with at least one of said data connection and said power connection and to attach an external peripheral device to the base in the bay, at least one of the data connection and the power connections for each bay being disposed within the upright portion of the base.

26. The apparatus of claim 23, further comprising a computing device disposed within the base and internally coupled to said data connection in each bay, such that an external peripheral device coupled directly to the data connection is thereby coupled to said computing device.

27. The apparatus of claim 23, wherein said data connection in each bay is adapted to couple to an external computing device, such that when said data connection is coupled to an external computing device, any external peripheral device coupled to said data connection is thereby coupled to said external computing device.

28. The apparatus of claim 23, wherein said rail is further adapted to provide electrostatic discharge protection.

29. A method for coupling a plurality of external peripheral devices to a computing device, comprising the steps of:
   (a) providing a structure that both supports a plurality of external peripheral devices and electrically couples to a data port and a power port on each of the plurality of external peripheral devices, said structure thereby providing a connection from each of the plurality of external peripheral devices to the computing device; and
   (b) providing a plurality of rails on the structure that are adapted to mechanically attach the plurality of external peripheral devices to said structure, with the data port and the power port of each external peripheral device coupled to the structure.

30. The method of claim 28, further comprising the step of sliding one of the plurality of external peripheral devices over one of the plurality of rails to couple the data port and the power port of the external peripheral device to the structure.

31. The method of claim 29, further comprising the step of providing the computing device within the structure.

32. The method of claim 29, further comprising the step of providing power to the power port of the external peripheral device through the rail on which the external peripheral device is attached to the structure.

33. The method of claim 29, further comprising the step of providing data to the data port of the external peripheral device through the rail on which the external peripheral device is attached to the structure.

34. The method of claim 29, further comprising the step of providing an alignment pin for each external peripheral device that is supportable by the structure.

35. The method of claim 29, further comprising the step of providing a visual indicator to facilitate aligning each external peripheral device with the structure.

36. The method of claim 29, further comprising the step of coupling the structure to an external computing device through a data cable.

37. Apparatus for supporting a plurality of external peripheral devices so that they can be connected to a computing device, comprising:
   (a) a data connection adapted to couple directly to a data port on an external peripheral device, to convey data between an external peripheral device and a computing device without using any external cable extending between the external peripheral device and the computing device;
   (b) a power connection for coupling directly to a power port on an external peripheral device; and
   (c) a base comprising a rail adapted to align an external peripheral device relative to the base, wherein at least one of said data connection and said power connection is disposed on said rail.

38. Apparatus for support a plurality of external peripheral devices thereon and for connecting the plurality of external peripheral devices to a computing device, said apparatus comprising:
   (a) a base; and
   (b) a plurality of bays defined on the base, each bay interfacing with an external peripheral device and each bay including:
      (i) a data connection for directly coupling to a data port on an external peripheral device;
      (ii) a power connection for supplying electrical power directly to a power port on an external peripheral device; and
      (iii) a rail providing alignment of an external peripheral device mounted in the bay, wherein at least one of said data connection and said power connection is disposed on said rail.

39. Apparatus for supporting a plurality of external peripheral devices so that they can be connected to a computing device, comprising:
   (a) a base including:
      (i) the computing device disposed within said base;
      (ii) a data connection adapted to couple directly to a data port on an external peripheral device, to convey data between an external peripheral device and said computing device without using any external cable extending between the external peripheral device and the computing device; and
      (iii) a power connection for coupling directly to a power port on an external peripheral device.

40. Apparatus adapted to support a plurality of external peripheral devices thereon and for connecting the plurality of external peripheral devices to a computing device, said apparatus comprising:
   (a) a base comprising having the computing device disposed within said base, said base defining a plurality of external bays, each bay interfacing with an external peripheral device and each bay including:
      (i) a data connection for directly coupling to a data port on an external peripheral device, said data connection being electrically coupled to said computing device;
      (ii) a power connection for supplying electrical power directly to a power port on an external peripheral device; and
      (iii) a rail that aligns an external peripheral device within the bay, said rail engaging an external peripheral device and aligning an external peripheral device to couple with said data connection and said power connection.

* * * * *

UNITED STATES PATENT AND TRADEMARK OFFICE
CERTIFICATE OF CORRECTION

PATENT NO.    : 6,424,525 B1
DATED         : July 23, 2002
INVENTOR(S)   : MacLeod et al.

Page 1 of 1

It is certified that error appears in the above-identified patent and that said Letters Patent is hereby corrected as shown below:

Column 3,
Line 57, "resent" should read -- present --.

Column 7,
Line 4, "power pad 214" should read -- power⁻ pad 214 --.
Line 6, "power" should read -- power⁻ --.
Line 27, "data$^{31}$" should read -- data⁻ --.

Column 10,
Lines 15, 20, 24, 27, 35, and 40, "Claim 12" should read -- Claim 15 --.
Line 63, "Claim 23" should read -- Claim 25 --.

Column 11,
Lines 1 and 7, "Claim 23" should read -- Claim 25 --.
Line 23, "Claim 28" should read -- Claim 29 --.

Signed and Sealed this

Twenty-first Day of March, 2006

JON W. DUDAS
*Director of the United States Patent and Trademark Office*